Patented Dec. 18, 1951

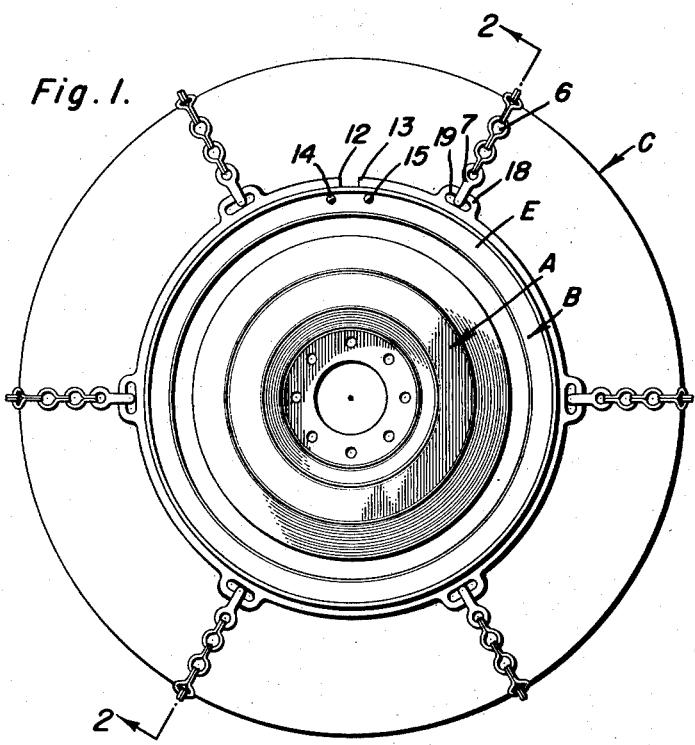
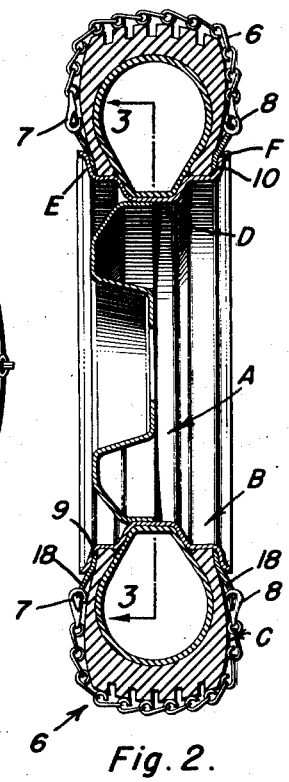
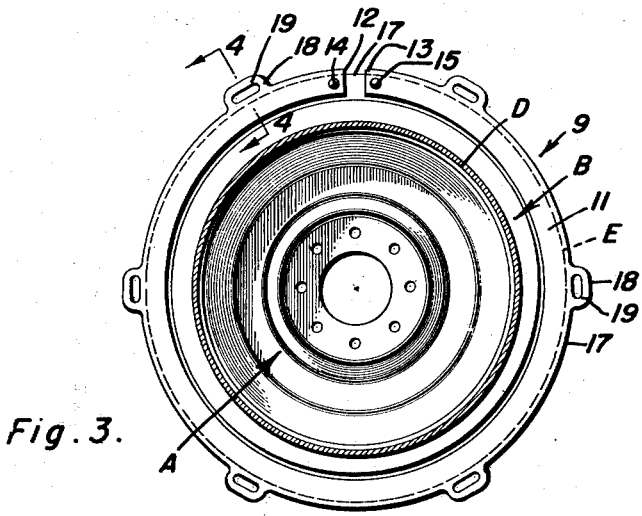
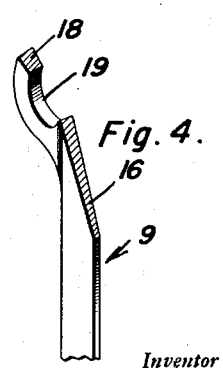
Fig. 1.
Fig. 2.
Fig. 3.
Fig. 4.
Inventor
Philip C. Traver, Sr.

2,579,057

UNITED STATES PATENT OFFICE 2,579,057

ANTISKID CHAIN ATTACHING MEANS

Philip C. Traver, Sr., Far Rockaway, N. Y., assignor of fifty per cent to Harry Forman, Far Rockaway, N. Y.

Application June 13, 1949, Serial No. 98,737

2 Claims. (Cl. 152—233)

The present invention relates to means whereby anti-skid chains may be conveniently attached to a vehicle wheel in proper association with a pneumatic tire mounted on said wheel.

It is a matter of common knowledge that the field of invention under advisement, insofar as it relates to patents and inventions, is not only highly active but is characterized by countless styles and types of chain constructions. The present invention, however, has more particular reference to circumferentially spaced individual chain units which have come into use quite extensively in recent times. The object of the invention is to structurally, functionally and otherwise improve upon anti-skid chains in the particular classification under advisement.

More specifically, the invention has to do with suitable short chains adapted to extend across the tread of the tire and to partly embrace the side walls of the tire, means being provided for anchoring the end portions on the accompanying wheel. In keeping with my ideas, the free ends of the respective chains have snap fasteners and these are adapted to be readily snapped into apertured lugs or eyes carried by the wheel rim.

In carrying out the preferred embodiment of the invention, I contemplate using two split rings and these are fitted and riveted into the wheel rim and are formed at circumferentially spaced points with apertured lugs constituting eyes for attachment thereto of the snap hooks or fasteners on the chain.

Other objects and advantages will become more readily apparent from the following description and the accompanying illustrative drawing.

In the accompanying sheet of drawings:

Figure 1 is an elevational view showing a conventional wheel with pneumatic tire thereon and showing, in addition, improved anti-skid chains and means for anchoring same in position for use;

Figure 2 is a section taken on the plane of the line 2—2 of Figure 1, looking in the direction of the arrows;

Figure 3 is a central sectional view on the line 3—3 of Figure 2, looking in the direction of the arrows and with the tire removed;

Figure 4 is an enlarged fragmentary detail sectional view on the line 4—4 of Figure 3.

Referring now to the drawing by distinguishing reference characters, the old or well known parts are denoted by reference letters. That is to say, A denotes a conventional metal automobile or vehicle wheel and B a rim thereon. The rim may be identified either as a wheel rim or, if preferred, as a tire rim to accommodate the pneumatic tire C. The tire is of course conventional. The rim is likewise conventional and is of the type which includes a drop center D and marginal flanges E and F to retain the beaded side walls of the tire casing in place.

My improved anti-skid chains, which are of any suitable link construction, are denoted by the numerals 6 and each has snap hooks 7 and 8 at opposite ends. Provision is made on the wheel rim to permit the hooks to be anchored on said rim. I provide, to accomplish this step, a pair of ring-like adapters 9 and 10. Each adapter is the same in construction and a description of one will suffice for both. That is to say, each adapter comprises a split annular band or ring 11 (see Figure 3) which is such that it fits into the rim in contact with the inner surface of the coacting flange. The split ends are denoted by the numerals 12 and 13 and are riveted to the rim flange E as shown at points 14 and 15. The body portion of said ring is of tapered form as shown at 16 in Figure 4 and therefore sufficient resilient properties are had to allow said ring to conform more-or-less to the surfaces of the flange with which it coacts. The outer marginal edge 17 of the ring is provided at circumferentially spaced points with lugs 18 having holes or apertures 19 constituting keepers for the aforementioned snap hooks.

By inserting the split rings in the tire rim and riveting same to the coacting flanges of said rim as shown in Figure 3 of the drawings and by allowing the lugs to project beyond the outer peripheral edge of the rim flange, the keepers are thus constantly and permanently in position to receive the snap fasteners on the ends of the anti-skid chains. To apply the chains, it is only necessary to deflate the tire and snap the chains in place. Then, the tire is again inflated and the chains put under sufficient pressure to maintain themselves against accidental displacement.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a structure of the class described, in combination, a wheel having a rim to accommodate a pneumatic tire, said rim having side flanges for retaining the beaded side walls of the casing in place, a pneumatic tire fitted removably on said rim, individual anti-skid chains adapted to extend transversely across the tread of the tire, said chains being provided at the free ends with snap-hooks, a pair of spaced parallel adapter rings anchored, respectively, on the side flanges of said rim and provided with circumferentially spaced keepers, said snap-hooks being releasably anchored in said keepers, said rings being wedge-shaped in cross-section and said keepers being on a plane with said rings.

2. In a structure of the class shown and described, a vehicle wheel embodying a marginal rim, said rim having spaced parallel tire retaining flanges, a pair of split rings fitted in said rim and riveted respectively to said flanges, said split rings constituting chain adapters, the outer perimeter edges of the rings being provided with outstanding circumferentially spaced lugs, said lugs being apertured to provide keepers to accommodate snap-hooks on anti-skid chains, said rings being substantially V-shaped in cross-section.

PHILIP C. TRAVER, SR.

REFERENCES CITED

The following references are of record in the file of this patent:

UNITED STATES PATENTS

| Number | Name | Date |
|---|---|---|
| 2,171,592 | Nagle | Sept. 5, 1939 |
| 2,204,886 | Devlin | June 18, 1940 |
| 2,241,592 | Goldenberg | May 13, 1941 |
| 2,344,970 | Copp | Mar. 28, 1944 |